UNITED STATES PATENT OFFICE.

CLARANCE CHARLES WELLS, OF FORT WORTH, TEXAS.

COMPOSITION OF MATTER FOR THE WELDING AND SOLDERING OF ARTICLES CONSTRUCTED OF ALUMINUM.

1,239,854.   Specification of Letters Patent.   Patented Sept. 11, 1917.

No Drawing.   Application filed June 23, 1917. Serial No. 176,535.

*To all whom it may concern:*

Be it known that I, CLARANCE CHARLES WELLS, a citizen of the United States, residing at Fort Worth, in the county of Tarrant and State of Texas, have invented a new and useful Composition of Matter for the Welding and Soldering of Articles Constructed of Aluminum.

My composition consists of the following ingredients, combined in the proportions stated, viz:

| | |
|---|---|
| Aluminum | 1 part. |
| Lead | 3 parts. |
| Block tin | 7 parts. |
| Zinc | 2 parts. |

These ingredients are subjected to heat until in a molten state at which time they are thoroughly mingled by agitation; they requiring a heat of seven to eight hundred degrees Fahrenheit to cause them to become in such a molten state as to mingle freely, and become one molten mass. The different ingredients after being melted and thoroughly mingled by agitation and while still in the molten form is treated four to seven times with muriatic acid of strength thirty-two per cent. pure, the acid being poured into the composition to purify and cleanse the same; the acid after evaporation leaves the sediment and dirt in the composition floating on the surface, which sediment and dirt is skimmed from the surface leaving the composition pure and clean and ready to be poured into forms or molds suitable to the manufacturer. The quantity of muriatic acid used in the process of cleansing each time is three parts the amount of alloy. The use of the muriatic acid has no effect on the melted condition of the ingredients, as it is used while they are in a molten condition, or while left on the heat, and only used for cleaning the mixture just before being molded, and the whole not being removed from the heat while undergoing the process of cleansing with the muriatic acid, the metal mixture remains in the liquid state.

In using the above-named composition the article to be welded or soldered should first be freed from all dirt and obstacles by brushing the ends to be welded, or the surface to be soldered with a steel wire brush. The parts so cleansed are then subjected to heat with an ordinary gasolene blow torch, at a temperature of about seven to eight hundred degrees, at which time the said compound is applied under the heat, which causes the composition to become soft and doughy when it is worked into the desired shape to correspond with the ends being welded, after which the work is allowed to cool and is ready for use.

By the use of the above composition the crystallization of aluminum ware is avoided in the process of welding or soldering as it only requires seven or eight hundred degrees of heat to place it in proper shape for work, whereas under other processes of welding and soldering articles constructed of aluminum by the acetylene process there is required a heat of from twenty-five hundred to thirty-five hundred degrees, which causes aluminum to crystallize and weakens it, as aluminum will only stand about fourteen to fifteen hundred degrees of heat. The composition herein is stronger than aluminum and has an elasticity and flexibility not common in aluminum articles, does not injure the metal to which it is applied, as it melts at a low temperature, and avoids the effect of crystallizing the article being worked upon.

I am aware that a composition consisting of aluminum, lead, block tin, zinc, bismuth and antimony have been used for the same purpose, and that a patent therefor was granted to one Robert Lee Weatherford, August 8th, 1916, No. 1,194,101; but I am not aware that all the ingredients of my composition and my process of manufacture have been used together.

I claim:

The herein described composition for welding and soldering articles constructed of aluminum, consisting of aluminum one part, lead three parts, block tin seven parts and zinc two parts, substantially as described.

CLARANCE CHARLES WELLS.

Witnesses:
 PEYTON ENGLISH WADE,
 HENRY DEE PAYNE.